April 14, 1970    R. L. BALKE ET AL    3,505,729
METHOD OF MAKING STATORS FOR DYNAMOELECTRIC MACHINES
Original Filed June 28, 1965    2 Sheets-Sheet 1

INVENTORS
ROY L. BALKE
ROBERT S. PEARSON
BY
THEIR ATTORNEY

INVENTORS
ROY L. BALKE
ROBERT S. PEARSON

THEIR ATTORNEY

United States Patent Office 3,505,729
Patented Apr. 14, 1970

3,505,729
**METHOD OF MAKING STATORS FOR
DYNAMOELECTRIC MACHINES**
Roy L. Balke and Robert S. Pearson, Erie, Pa., assignors to General Electric Company, a corporation of New York
Original application June 28, 1965, Ser. No. 467,432, now Patent No. 3,330,977, dated July 11, 1967. Divided and this application Apr. 27, 1967, Ser. No. 634,331
Int. Cl. H02k 15/00
U.S. Cl. 29—596      5 Claims

ABSTRACT OF THE DISCLOSURE

A method of making stators for dynamoelectric machines wherein coils are positioned within the electrically insulated slots of the stator and a layer of thermosetting resin composition is applied to the inside surface of the stator and over the conductors positioned within the slots thereof. A layer of loose weave glass cloth is embedded into the resin composition and radial pressure is applied to force the resin composition into and around the fibers of the glass cloth and compress them against the surface of the stator bore. The resin composition is cured while the radial pressure is maintained to form a rigid hoop of hardened resin intimately bonded to the inside surface of the stator bore.

CROSS REFERENCE TO RELATED APPLICATION

This is a division of application Ser. No. 467,432, filed June 28, 1965.

BACKGROUND OF THE INVENTION

This invention relates to stators for dynamoelectric machines and more particularly to the method of making dynamoelectric machine stators of the open slot type.

By open slot stators reference is made to stators defining slots having no overhanging means for retaining the windings therein. Generally, the slots of such stators are of substantially rectangular cross section having straight, substantially parallel side walls, although in some open slot stators there may be very slight taper of the walls. The use of open slot stators in dynamoelectric machines offers several advantages such as, for example, ease of assembly of coil sides in the stator and reduction in tooth to tooth flux leakages, as compared to an overhung or semiclosed slot design. Additionally, especially where rectangular cross section conductors are utilized, a high space factor is usually obtainable. It is well known in the art that the electromagnetic efficiency of a stator is increased as the conductors are placed closer to the opening of the stator bore. Such placement also requires stator slots of less depth thereby allowing for a stator of smaller diameter for a given machine output and contributing to savings in material and reduction in machine weight. Such features are especially desirable for aerospace applications, for example.

It is conventional practice to provide a cover for the top conductors in each stator slot to retain the conductor therein and to environmentally protect the conductors from contamination as well as to provide a dielectric barrier between the slot conductors and the iron stator core. This covering is usually provided by a top stick or wedge inserted into the stator slot and secured therein by a suitable undercut or tight interference fit. Wedging of the top stick into the slots by a tight interference fit may result in damage to the slot liner ultimately leading to a ground fault. Any undercut necessary to retain the top stick, on the other hand, decreases the electromagnetic efficiency of the stator and, since space must be provided to accommodate the thickness of the top stick, the slots must be depended and of necessity the top conductors therein are displaced a distance at least the thickness of the top stick from the stator bore. The desirability of providing conductors as near the stator bore as possible has long been recognized and the advantages resulting therefrom are manifest.

It is an object of this invention to provide a method of making stators for dynamoelectric machines which makes possible more complete utilization of available slot space so that the resulting stators require less iron for a given machine output.

It is a further object of this invention to provide a method of making stators for dynamoelectric machines which makes possible environmental protection and retention of windings in stator slots without requiring slot-space consuming top sticks or wedges.

Briefly stated, in accordance with one aspect of this invention, we provide a method of making stators for dynamoelectric machines by applying a thermosetting resin to the inside surface of the stator bore after the coils and slot liners have been suitably positioned in the slots thereof. A layer of nonconducting fibers, such as a loose weave glass cloth, is then embedded into the resin and radial pressure applied to force the resin into and around the fibers and compress such fibers against the stator bore surface. With the radial pressure maintained, the resin is cured to form the rigid hoop which protects the conductors and retains them in the stator slots.

The novel features believed characteristic of this invention are set forth with particularity in the appended claims. The invention itself, however, together with its organization and method of operation may best be understood by reference to the following description taken in conjunction with the accompanying drawings in which:

Figure 1:
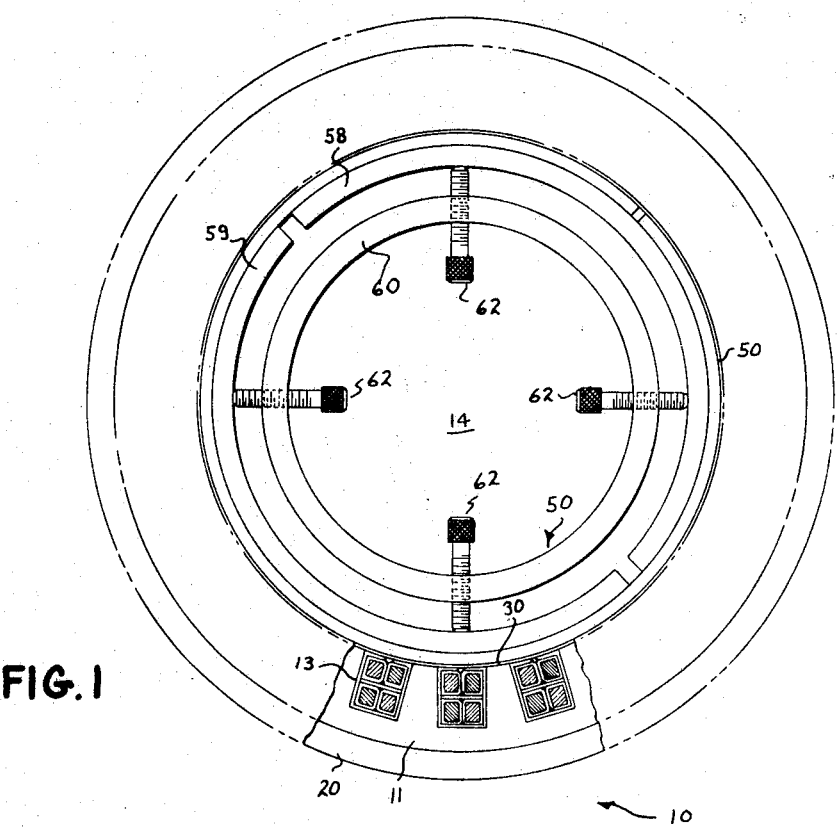
FIG. 1 is a partial plan view illustrating a dynamoelectric machine stator assembly with an expandable fixture therein useful in carrying out the method of this invention.
Figure 2:
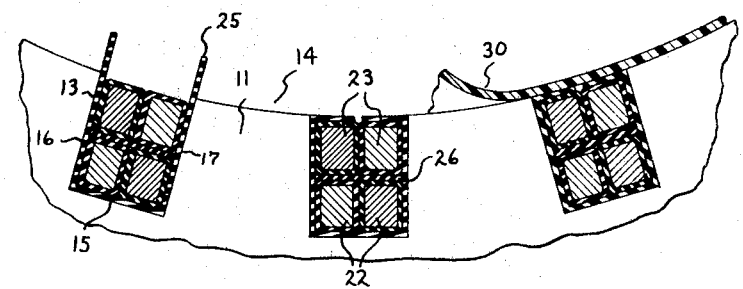
FIGS. 2 and 3 are fragmentary sectional views of dynamoelectric machine stator core incorporating the present invention.
Figure 3:
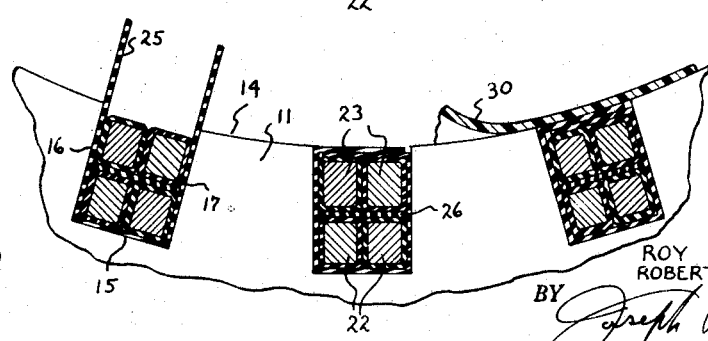

Referring now to FIGS. 1–3 of the drawings, there is shown a stator assembly 10 for a dynamoelectric machine including a core 11 having winding slots 13 therein which open into the stator bore 14. Electrical coils are positioned in the slots 13. Each of the winding slots 13 are illustrated as being of rectangular cross section and are defined by a bottom wall 15 and parallel side walls 16 and 17 which openly communicate with the stator bore 14. Stator bore 14 is arranged to receive a suitable rotor (not shown). Stator core 11, shown carried by a suitable frame or housing member 20, may be formed as is conventional from a plurality of stacked laminations of magnetic material.

As shown more clearly in FIGS. 2 and 3, each winding slot 13 contains bottom coil sides 22 and top coil sides 23. Coil sides 22 and 23 are insulated from the slots by slot liners 25 which are formed of suitable insulating material. To assure more complete insulation, and provide environmental protection as well, the top portions of the slot liners are folded over the top coil sides 23 to provide at least a partially closed tube surrounding the coil sides 22 and 23 in the slots. Ideally, therefore, the two ends of the slot liner 25 should abut to provide a complete tube without any overlap. It will be understood, however, that some gap between the slot liner ends is not objectionable so long as at least the corners of the top coil sides 23 are covered by such slot liner to assure a sufficiently large insulating path between the slot side walls and the coil sides adjacent thereto. Although, if desired, a completely closed tube may be provided by arranging to fold the ends of the slot liner over each other as illustrated in FIG. 3, it will be apparent that such overlapping increases the thickness at the top of the top coil sides thereby prevention such coil sides from getting as close to the stator bore as is actually possible when only a single thickness of slot liner is positioned over the coil sides such as in the manner illustrated in FIG. 2. Phase-to-phase insulation is provided in the conventional manner such as by suitable insulating spacers 26 positioned between the top and bottom coil sides in each slot. Suitable strips of insulating sheet material (not shown) are positioned between the overlapping end turns to insulate phases in well known manner.

In further accord with this invention, to provide conductors as near to the stator bore as possible, we obviate the need for the space consuming top sticks or wedges by providing a thermosetting retaining and protecting means 30 positioned within the stator bore and intimately bonded to the surface thereof to form a rigid retaining hoop upon curing. Preferably, the coil retaining and protecting means 30 comprises at least one layer of resin impregnated nonconducting fibers, such as glass. Also, the impregnating material is preferably an epoxy resin composition although various other resin polymers are also suitable, such as for example, polyester resins, phenolic resins, silicone resins and the like. Suitable commercially available epoxy materials, for example, are the epoxylated novolac resins and the bisphenolepichlorohydrin polymers. Examples of the latter materials are those sold under the trade name Epon–826 or 828 by the Shell Chemical Company, the Araldite epoxy resins such as Araldite 6005 or 6010 sold by the Ciba Company, Inc., the Epi-Rez epoxy resins, such as Epi-Rez 530 and 540 sold by the Jones-Dabney Company and other well-known epoxy resins.

The nonconducting fibers are applied so as to provide a continuous hoop within the stator bore and may be employed in any convenient form such as a roving or a loose weave, such as leno cloth. A leno glass cloth is preferred because the openings permit a resin fill thereof and a good impregnation of the cloth. Moreover, the woven cloth has unidirectional strength which contributes to the desired hoop strength as well as minimizing any resin cracking.

When the resin impregated material is cured, a rigid, dense homogeneous hardened resin-glass hoop is provided which is intimately bonded to the surface of the stator bore and provides a protective cover over the open ends of the winding slots and a retaining hoop to secure the coils in such slots. The rigid hoop so formed, which may be as little as .005 inch in thickness, for example, is the only means required to retain the coils in the slots under all machine operating conditions. Since the retaining means 30 is positioned within the stator bore itself, as distinguished from top sticks or wedges which are positioned within the slots, the coils are allowed to come within a slot liner thickness of the stator bore. That is, except for the thickness of the slot liner over the top of such coils, which, for example, may be as little as about .005 inch, the top coil sides are positioned at the stator bore. Moreover, since no top sticks are required, all disadvantages associated with them are overcome.

In accordance with another aspect of this invention, we provide a method of making the foregoing stator. In carrying out this method, in one form, slot liners 25 are inserted into winding slots 13. In accordance with conventional practice, slot liners 25 extend a small distance beyond each end of the stator core 11 to assure insulation for the coil sides 22 and 23 where such coil sides emerge from the slots 13. Slot liner 25 may be fabricated of any suitable insulating material such as, for example, polyimide or polyester impregnated glass cloth, polyimide film, or the like. Also, slot liners 25 may be formed to proper size and slot bottom shape prior to being positioned in slots 13, or they may be of a sufficiently pliable material so as to be formed to shape after being positioned in the slots. When the slot liners are formed in situ, the edges thereof are arranged to extend beyond the ends of the slot and into the stator bore. These extending edges are then folded over after the stator coils have been placed in the slots to provide added insulating protection especially between the top corner of the slot and the top coil side. Thus, the slot liners are suitably arranged to provide at least a partially closed tube surrounding the coil sides 22 and 23 in the slots.

The stator coils may be inserted either from the end of the stator core 11 or from the bore thereof through the open end of the slot liners. The coil sides are then suitably pressed down to seat them well in the slots. This may be accomplished either before, after or coincident with the bending over of the slot liner edges.

Figure 4:
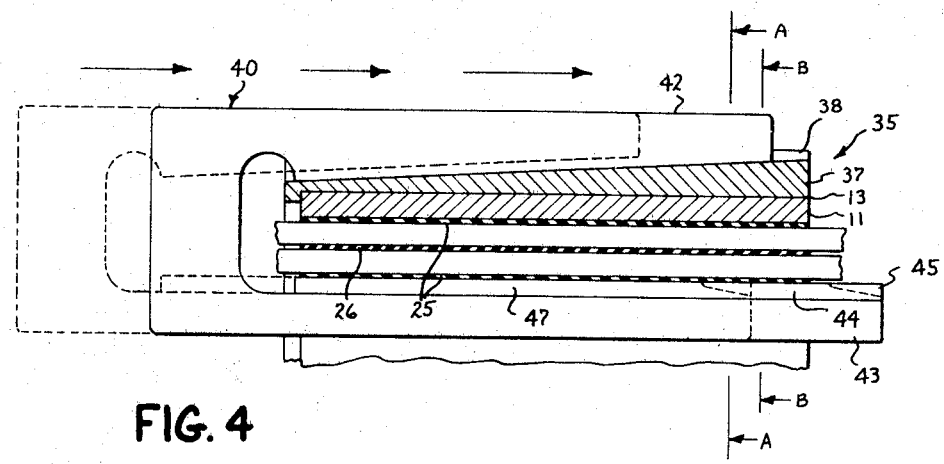
FIG. 4 is a partial sectional view of a fixture for folding the slot liner insulation and seating the coils in the stator slots operatively positioned about a stator core.
Figure 5:
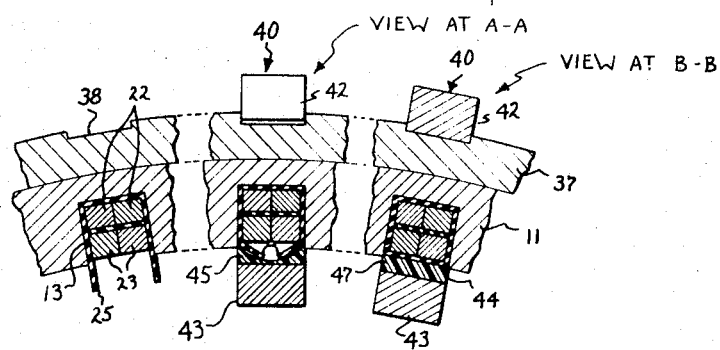
FIG. 5 is a fragmentary sectional view of the stator-fixture assembly of FIG. 4 including portions taken along the lines A—A and B—B thereof respectively.

In FIGS. 4 and 5 there are illustrated sectional views of a stator and a fixture which is especially suited for coincidently bending over the edges of the slot liners and seating the coil sides in place in the slots. As shown, the fixture 35 includes an annular member 37 into which the stator core 11 is adapted to be fitted. The outer peripheral surface of annular member 37 is provided with a number of slots 38 equal in number to the number of slots in the stator core 11. A plurality of C-type clamps 40 are provided one for each of the slots of the stator core. Each clamp 40 has a leg portion 42 and a leg portion 43 arranged so that the portion 42 of such clamp may be guided in a slot 38 of the annular member 37 while the other portion 43 thereof fits on top of the corresponding slot 13 of the stator core 11. The portion 42 is provided with a region 44 having a concave configuration at end 45 which terminates in a generally flat surface at the end 47 thereof. Region 43 may be either coated with a suitable mold release material, such as Teflon, or the like, or, as illustrated, may be fabricated entirely from such material. The slots 38 of member 37 and the portion 42 of C-clamps 40, which is guided therein, are provided with a three degree, or other suitable locking taper. The taper of slots 38 and portion 42 is shown clearly in FIG. 4.

In operation, the concave section of the end 44 of a C-clamp 40 is positioned above a stator slot 13 so that the edges of the slot liner 25 are guided thereby. The C-clamp 40, guided in slots 38 by the portion 42, is then moved to the right as illustrated by the arrows in FIG. 4. This movement and the coacting tapered surfaces of the slots 38 and the portion 42 operates to bend the edges of the slot liner down over the top of the top conductors and press the conductors in the slot. The clamps 40 are inserted one after the other in the foregoing described manner until each slot has a C-clamp associated therewith and all coil sides are, therefore, seated in the slots with the edges of the slot liner bent down.

Since it is desirable to temporarily retain the conductors in their seated position in the slots 13 of the stator core so that subsequent operations may be better carried out, a thermosetting resinous bonding or impregnating composition is preferably applied to the top of the conductors and/or the extending ends of the slot liners prior to positioning the C-clamp type clamps 40. With all clamps 40 of the fixture 35 in place the resinous composition is then suitably cured so that the conductors and slot liners remain in position during subsequent operations.

Alternatively, the resinous composition may be applied to the conductors after the fixture is positioned about the stator and the coils seated in the slots. For example, the assembly, with all C-clamps of the fixture applied, may be tilted slightly at one end and a liquid thermosetting resinous composition applied, as by brushing or the like, so that such material flows in the slots toward the other end. The resinous composition so applied is then cured as before and when the fixture 35 is removed, the conductors remain in their seated position.

With the conductors temporarily retained in the slots as described, a coating of a thermosetting resinous composition is then applied, such as by brushing, or, if a pasty composition is employed, by troweling, to the inside surface of the stator bore and over the conductors of the open slots. At least one layer of nonconducting fibers, such as a layer of leno weave glass cloth, is then embedded into the wet resinous composition at the surface of the stator bore so as to cover the entire surface thereof and preferably extend a short distance beyond each end of the stator. Although as thin a covering as possible is desirable for certain applications, additional layers of glass cloth may be employed if a heavier laminate is desired. After the glass cloth has been positioned within the stator bore, additional resinous composition may be applied over the cloth to provide a wet-lay-up.

The glass cloth-resin lay-up is then pressed tightly against the surface of the bore forcing the resin composition through the openings of the cloth. Any excess resin composition which has been squeezed out by such pressing is then removed and, with pressure still applied, the resin is cured. The temperature and time to effect a suitable cure for the resin composition depends upon the composition employed. Such curing techniques are well known in the art for the various resinous compositions. When the resin composition is suitably cured, a rigid hoop is formed within the stator bore intimately bonded to the surface thereof which band is operative to retain the coils in the slots and provide environmental protection for them also.

The cloth-resin lay-up may be pressed against the surface of the stator bore by means of a suitable fixture such as that illustrated at 50 in FIG. 1. Fixture 50 includes a resilient metallic band 52 having a diagonally directed discontinuity 53 to allow for radial expansion of the band 52 into the stator bore. In operation, the outer surface 55 of the band 52 has a suitable mold release composition applied thereto to prevent its sticking to the cloth-resin lay-up during the subsequent cure. Fixture 50 also includes members 58 and 59 which are sectors of an annulus which is positioned within the band 52. An annular member 60 is positioned within the members 58 and 59. Member 60 is provided with studs 62 which are threadably extended through such member and into contact with the members 59 and 60. Thus, when the studs 62 are threaded into the member 60 they force members 58 and 59 outwardly, radially expanding the band 52, which in turn presses the wet cloth-resin lay-up against the surface of the stator bore. The force so exerted on the wet lay-up operates to squeeze out excess resin and force resin into all the openings of the glass cloth. The pressure applied to the wet lay-up should be sufficient to assure a complete impregnation of the cloth with resin and flatten the glass fibers but not so great that the glass cloth itself is forced axially out of the stator bore.

With the expandable fixture still in place, the resin composition is subjected to a suitable curing cycle to provide the final rigid retaining and protecting band within, and intimately bonded to the surface of, the stator bore. The fixture 50 is thereafter removed from the stator bore and the inside surface of the cured cloth-resin laminate sanded or otherwise suitably treated, if necessary, to remove any irregularities thereof.

As described fully above the rigid retaining and protecting band within the stator bore may be formed of various nonconducting fibers and impregnating thermosetting polymers. The following specific examples are, therefore, set out merely for the purpose of further illustrating the method of the invention and are not to be taken as placing any restriction or limitation on the invention.

Example I

A stator core having an outside diameter of 7.375 inches and a bore of 5.58 inches is prepared for winding by cleaning the bore and slots and deburring the slots in the usual manner. Each of the winding slots is lined with a pliable insulating sheet material composed of a polyester resin impregnated glass cloth with the edges thereof extending into the stator bore. The edges of the sheet material are trimmed so that when bent down they form a near close-up of slot liner insulation such as shown in FIG. 2.

After the slot liner material is in place, electrically insulated conductors are placed in the slots with suitable spacers therebetween to provide for phase insulation in the usual manner. The conductors are arranged to form the stator winding. The conductors are inserted in the lined slot from the stator bore through the open end of the slot liners. A thixotropic epoxy resin bonding composition is applied over the conductors and the edges of the slot liners. The epoxy resin material has the following composition:

| | Parts by weight |
|---|---|
| Araldite 6005 (resin) | 100 |
| Boron tri-fluoride-monoethylamine | 3 |
| Silica (200 mesh) | 50 |
| Fumed silica | 4–6 |
| 1/32″ milled glass fibers | 7 |
| Polyethylene glycol | 6 |

The fixture 35, illustrated in detail in FIGS. 4 and 5, is then applied to the stator assembly to bend over the edges of the slot liners and seal the conductors in the slots. With the fixture so fitted in place about the stator assembly, the resinous bonding composition is cured by placing the complete assembly into an oven and baking therein for about two hours at a temperature of about 150° C. The fixture 35 is then removed.

A thin film of the foregoing thixotropic epoxy resin bonding composition is then applied over the inside surface of the stator bore and the slot liners and conductors in the slots thereof. A .007 inch thick leno glass cloth is embedded into the film of epoxy resin bonding composition at the surface of the stator bore so as to cover the entire bore surface and extend from about 1/4 to 1/8 inch beyond the ends of the stator core. The expandable hoop fixture, shown in place within the bore of stator 10 in FIG. 1, is placed within the stator bore and thereafter expanded therein to force the epoxy resin into all the openings of the glass cloth and to impregnate and cover the cloth with such composition as well as compress the cloth fibers flat against the stator bore. Prior to inserting the expandable fixture into the stator bore, the outer surface 55 of the band 52 thereof is coated with a mold release material by wrapping such band with a Teflon-glass laminate. Excess epoxy resin bonding composition forced out by the expanded fixture is removed from the stator assembly and, with the fixture still expanded in the stator bore, the entire stator assembly is baked for about four (4) hours at a temperature of about 160° C.

After the fixture is removed the inside surface of the glass cloth-resin laminate may be sanded if necessary to remove any rough or high spots and provide a bore of uniform diameter which will properly receive the associated rotor. Usually, however, no sanding or other operation is required. The glass cloth-resin laminate, when cured, forms a rigid hoop intimately bonded to the surface of the stator bore and within the usual "air gap"

portion thereof which retains the coils in the slots and provides protection for them. Thus, full utilization of the slot is afforded since the conductors are placed within a slot liner thickness of the air gap.

Example II

A stator core having an outside diameter of 7.375 inches and a bore of 5.58 inches was prepared for winding by cleaning the bore and cleaning and deburring the slots in the usual manner. Each of the winding slots was lined with a polyimide sheet material .005 inch thick. The material used was a flexible polyimide sheet material sold by the Du Pont de Nemours Company under the trademark H-film. The ends of the slot liner insulation material extended about ⅜ inch from the top of the slot into the stator bore and about ⅛ inch from each end of the stator core to provide adequate creepage for dielectric purposes. To assure that the sheet material forming the slot liner fit closely into each corner of the slot bottom, a crease was provided in such material.

Electrically insulated conductors and phase-to-phase insulation was suitably positioned in the winding slots in a conventional manner by placing such conductors into the slots through the open end of the slot within the stator bore. The conductors were HML enameled rectangular copper and the phase insulation was provided by .005 inch thick H-film fabricated to a "window" configuration so as to function to insulate phases in the end turn region of the winding and separate coils in the slots. HML is a trademark of the Du Pont Company to designate a polyimide magnet wire insulating enamel. Additional phase-to-phase insulation was provided in each slot by inserting a strip of silicone-glass laminate .010 inch in thickness between the top and bottom coil sides in each slot.

After all conductors were placed in their respective slots, a polished steel slot liner trimming tool, approximately ⅗₆ inch square, was placed over the stator tooth adjacent to the portion of the slot liner extending into the stator bore and the slot liner trimmed with a conventional trimming tool along the full length of the slot liner to a length of about ⅗₆ inch above the top of the slot. The ⅗₆ inch slot liner extension was then folded over and under in a manner to close over the conductor at the bore as shown in FIG. 3 for example. The slot liners are bent over, conductors seated and temporarily retained in place employing the fixture 35 in the manner set forth in Example I.

A thin layer of a pasty epoxy bonding compound was applied, by troweling, to the surface of the stator bore covering the folded slot liner and stator teeth and extending from the core ends approximately ¼ inch. The epoxy compound at such extending ends of the core was also worked into the conductors and the extending ends of the slot liner. The epoxy bonding compound employed had the same composition as that of Example I with additional fillers to provide its pasty consistency.

A single layer of .007 inch thick leno glass cloth was placed into the wet epoxy bonding composition and an additional amount of epoxy bonding composition applied over the glass cloth so as to thoroughly impregnate and embed the glass cloth into the epoxy bonding compound.

The glass cloth-epoxy bonding composition lay-up was pressed to the surface of the stator bore by inserting the expandable hoop fixture 50 shown in FIG. 1. The outer surface of the band of the hoop fixture was first wrapped with a Teflon-glass laminate to serve as an epoxy mold release. The hoop was then expanded into the stator bore and excess bonding composition, which had been squeezed out by such expansion, was removed.

With the fixture expanded in place in the stator bore, the complete stator assembly was placed into an oven maintained at a temperature of 160° C. and baked therein for four (4) hours to cure the cloth-epoxy laminate to a dense rigid mass. After curing in the foregoing manner, the fixture was removed from the stator bore and the inside surface of the cloth-epoxy laminate was sanded to remove any high spots. The rigid hoop within the stator bore had a thickness of about .006 inch, was intimately bonded to the iron of the stator bore and was the only means required to both protect the conductors and retain them permanently in the slot. Since no top sticks were required, the top conductors were disposed very close to the stator bore.

While only certain preferred embodiments of the invention have been set forth by way of illustration, many changes and modifications will occur to those skilled in the art. Accordingly, we intend by the appended claims to cover all such changes and modifications as fall within the true spirit and scope of the invention.

What we claim as new and desire to secure by Letters Patent of the United States is:

1. In the manufacture of dynamoelectric machine stators of the type having open slots therein communicating with the bore of said stator, the method of retaining and protecting the conductors in said slots comprising:
    (a) furnishing a stator having open slots therein, said slots having no overhanging means for retaining the windings therein,
    (b) lining each of said slots with insulating material, the end of which are arranged to extend into the stator bore;
    (c) inserting conductors in said slots;
    (d) bending the extending ends of said slot lining insulating material over the top of said conductors to form at least a partially closed tube surrounding said conductors;
    (e) applying a thermosetting resin to the surface of said stator bore and over the bent over portions of said insulating material;
    (f) placing at least a single layer of loose weave glass cloth into said wet resin to cover the entire stator bore surface;
    (g) pressing said glass cloth into intimate, uniform contact with said stator bore and the resin applied thereto to force said resin through all the openings of said glass cloth and form a wet resin-cloth laminate; and
    (h) curing said resin-cloth laminate while said pressure is applied thereto to form a rigid band within said stator bore intimately bonded to the surface thereof.

2. In the manufacture of dynamoelectric machine stators having open slots therein communicating with the bore of said stator, the method of retaining and protecting the conductors in said slots without slot-space consuming top sticks comprising:
    (a) providing a stator having open slots therein, said slots having no overhanging means for retaining the winding,
    (b) lining each of said slots with an insulating material arranged and adapted to be formed into at least a partially closed slot-liner tube for conductors positioned in said slots;
    (c) placing conductors within said slots and forming said lining to provide said at least partially closed surrounding tube;
    (d) applying a thermosetting resin to the surface of said stator bore and at least the top surface of said slot liners;
    (e) placing at least a single layer of loose weave glass cloth into said resin so that the entire surface of said stator bore is covered thereby;
    (f) applying uniform radial pressure to the cloth-resin lay-up to force said resin through all of the openings of said cloth and thoroughly impregnate said cloth with such resin; and
    (g) curing said resin-cloth lay-up while said radial pressure is applied thereto to provide an annular band intimately bonded to the surface of said stator bore, said band being composed of said glass cloth bonded into a rigid, dense, homogeneous mass by the hardened resin.

3. The method of claim 2 wherein additional resin is applied to the glass cloth after it is placed in said stator bore and prior to the application of said radial pressure.

4. In the manufacture of dynamoelectric machine stators of the type having open slots therein communicating with the bore of said stator, the method of retaining and protecting, and protecting the conductors in said slots comprising:

(a) providing a stator having open slots therein, said slots having no overhanging means for retaining the winding,
(b) lining each of said slots with insulating material, the ends of which are arranged to extend into the stator bore;
(c) inserting conductors in said slots;
(d) bending the extending ends of said slot lining insulating material over the top of said conductors to form at least a partially closed tube surrounding said conductors;
(e) seating said conductors in said slots;
(f) bonding said seated conductors in said slots with a thermosetting resin;
(g) applying a thermosetting resin to the surface of said stator bore and over the bent over portions of said insulating material;
(h) placing at least a single layer of loose weave glass cloth into said wet resin to cover the entire stator bore surface;
(i) pressing said glass cloth into intimate, uniform contact with said stator bore and the resin applied thereto to force said resin through all the openings of said glass cloth and form a wet resin-cloth laminate; and
(j) curing said resin-cloth laminate while said pressure is applied thereto to form a rigid band within said stator bore intimately bonded to the surface thereof.

5. In the manufacture of dynamoelectric machine stators of the type having open slots therein communicating with the bore of said stator, the method of retaining and protecting the conductors in said slots comprising:

(a) providing a stator having open slots therein, said slots having no overhanging means for retaining the winding,
(b) lining each of said slots with insulating material, the ends of which are arranged to extend into the stator bore;
(c) inserting conductors in said slots;
(d) applying a thermosetting resin to at least the top of said conductors and/or extending ends of said slot lining insulating material;
(e) bending the extending ends of said slot lining insulating material over the top of said conductors to form at least a partially closed tube surrounding said conductors;
(f) applying radial pressure to said conductors to seat them in said slots;
(g) at least partially curing said thermosetting resin while maintaining said radial pressure on said conductors to bond said conductors in their seated position in said slots;
(h) applying a thermosetting resin to the surface of said stator bore and over the bent over portions of said insulating material;
(i) placing at least a single layer of loose weave glass cloth into said wet resin to cover the entire stator bore surface;
(j) pressing said glass cloth into intimate, uniform contact with said stator bore and the resin applied thereto to force said resin through all the openings of said glass cloth and form a wet resin-cloth laminate; and
(k) curing said resin-cloth laminate while said pressure is applied thereto to form a rigid band within said stator bore intimately bonded to the surface thereof.

References Cited

UNITED STATES PATENTS

| | | | |
|---|---|---|---|
| 2,648,018 | 8/1953 | Meier | 310—43 |
| 1,675,419 | 7/1928 | Myers | 310—45 X |
| 2,573,126 | 10/1951 | Andrus. | |
| 2,965,776 | 12/1960 | Bluth et al. | 310—45 X |
| 3,048,651 | 8/1962 | Howard et al. | 174—120 |
| 3,151,262 | 9/1964 | Howard et al. | 310—45 X |

CHARLIE T. MOON, Primary Examiner

C. E. HALL, Assistant Examiner

U.S. Cl. X.R.

310—45, 214